United States Patent
Lin

(10) Patent No.: US 11,423,809 B2
(45) Date of Patent: Aug. 23, 2022

(54) SUPPORT ASSEMBLY FOR ADVERTISEMENT OR PHOTOGRAPHY

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 17/099,838

(22) Filed: Nov. 17, 2020

(65) Prior Publication Data

US 2021/0150940 A1 May 20, 2021

(30) Foreign Application Priority Data

Nov. 18, 2019 (CN) .......................... 201921987002.9

(51) Int. Cl.
*G09F 7/18* (2006.01)
*G03B 15/06* (2021.01)

(52) U.S. Cl.
CPC ............... *G09F 7/18* (2013.01); *G03B 15/06* (2013.01); *G09F 2007/1847* (2013.01); *G09F 2007/1873* (2013.01)

(58) Field of Classification Search
CPC ............... G09F 7/18; G09F 2007/1874; G09F 2007/1847; G03B 15/06
See application file for complete search history.

(56) References Cited

U.S. PATENT DOCUMENTS

| | | | | |
|---|---|---|---|---|
| 2,052,771 A | * | 9/1936 | Johnson | G09F 7/002 40/607.09 |
| 3,088,235 A | * | 5/1963 | Kies | G09F 7/22 40/613 |
| 4,095,360 A | * | 6/1978 | Dinan | G09F 7/22 40/613 |
| 4,516,620 A | * | 5/1985 | Mulhern | A01G 9/02 160/351 |
| 6,162,158 A | * | 12/2000 | Mercer | B65D 23/0871 493/357 |
| 6,164,005 A | * | 12/2000 | Copeland | A01M 31/025 135/901 |
| 6,484,427 B1 | * | 11/2002 | Santa Cruz | G09F 21/04 40/643 |
| 7,424,864 B2 | * | 9/2008 | McCann | G09F 15/0025 116/173 |
| 2019/0328117 A1 | * | 10/2019 | Larsen | A47C 31/11 |

* cited by examiner

*Primary Examiner* — David R Dunn
*Assistant Examiner* — Christopher E Veraa
(74) *Attorney, Agent, or Firm* — Lin & Associates Intellectual Property, Inc.

(57) ABSTRACT

A support assembly for advertisement or photography, comprising a support bracket and a reversible cloth structure attachable to the support bracket. The cloth structure includes at least two pieces of cloth that are quadrilaterals with a same size and overlapped with one another. The upper and lower adjacent edges of the at least two pieces of cloth are respectively joined together to form an upper joined edge and a lower joined edge so as to form a channel between each two adjacent pieces of cloth. The other opposite edges on the left and right sides of the at least two pieces of cloth respectively form a channel entrance and a channel exit. The upper and lower joined edges can be turned over toward the channel entrance, inserted into the channel and pulled out from the channel exit to turn the inner surfaces of two adjacent pieces of cloth outward.

5 Claims, 17 Drawing Sheets

SUPPORT ASSEMBLY FOR ADVERTISEMENT OR PHOTOGRAPHY

CROSS-REFERENCE TO RELATED APPLICATION

This application claims the priority of Chinese patent application No. 201921987002.9, filed on Nov. 18, 2019, which is incorporated herewith by reference.

BACKGROUND OF THE INVENTION

1. Field of the Invention

The present invention relates to a support assembly advertisement or photography.

2. The Prior Arts

In the existing advertisement tools, one of them is used to hang an advertising board or an advertising poster on a support bracket and then to place it in an appropriate place to achieve an advertisement effect. A single advertising board or advertising poster can only provide at most two pages including a front surface and a back surface; therefore, it requires multiple advertising boards or advertising posters when more than two advertising pages are needed. In use, generally, one page is selected and the advertising board or advertising poster of the selected page is hung on the support bracket, while the remaining advertising boards or advertising posters are placed separately. As such, they are easy to be lost.

Photography reflectors are one type of the existing photography equipment. There have been mature use and storage method for the existing photography reflectors that include an inner layer and an outer layer. A coil of elastic steel wire is provided at an edge of the inner-layered cloth, and a zipper is provided at an edge of the outer-layered cloth. When the inner-layered cloth is used, the outer-layered cloth is taken off. When the outer-layered cloth is used, the outer-layered cloth is sleeved on the inner-layered cloth, the desired surface to be used is placed outward, the zipper is closed, and the steel wire of the inner-layered cloth is used as the support so that the outer-layered cloth can be used. When the photography reflector is stored, the whole reflector is folded into an "8" shape, and then is folded into a smaller circular shape. The main disadvantage of such design is that the folded shape of the reflector is circular, while the support bracket used in cooperation with the reflector is in a long bar shape. Therefore, it will occupy a relatively larger space to store, and the inner-layered cloth and outer-layered cloth are separated from each other, thereby having a risk of loss.

SUMMARY OF THE INVENTION

In order to overcome the problem of storage and the risk of loss of the existing advertising boards, advertising posters or photography reflectors, the present invention provides a support assembly for advertisement or photography, comprising: a reversible cloth structure including at least two pieces of cloth; and a support bracket. The reversible cloth structure is attached to the support bracket in a manner that the support bracket is located outside the reversible cloth structure. The upper and lower adjacent edges of the at least two pieces of cloth are respectively joined together to form an upper joined edge and a lower joined edge, such that a channel is formed in between each two adjacent pieces of cloth. By a manner of turning over the upper joined edge and the lower joined edge and then inserting them through the channel, the desired cloth surfaces can be turned over outward, so as to achieve the purpose of use.

The technical solution for solving its technical problem adopted by the present invention is to provide a reversible cloth structure attachable to a support bracket, including: at least two pieces of cloth, wherein the two pieces of cloth are quadrilaterals with a same size and are overlapped with one another; each of the two pieces of cloth has two cloth surfaces; upper and lower adjacent edges of the two pieces of cloth are respectively joined together to form an upper joined edge and a lower joined edge, such that a channel is formed in between each two adjacent pieces of cloth, and the other opposite edges on the two sides of the two pieces of cloth are respectively defined as a channel entrance and a channel exit. When the at least two pieces of cloth are disposed in a separate state from the support bracket, the upper joined edge and the lower joined edge can be turned over toward the channel entrance, inserted into the same channel and pulled out from the channel exit, so that the two cloth surfaces adjacent to the channel can be turned over outward, respectively; and when a part or all of the upper joined edge and the lower joined edge of the at least two pieces of cloth are attached to the support bracket, outsides of the at least two pieces of cloth are flatly disposed on the support bracket.

Preferably, the upper joined edge and the lower joined edge each are provided with a support stem.

Preferably, the channel entrance and the channel exit are non-linear.

The advantageous effect of the present invention is that the present invention joins the pieces of cloth together, changes the cloth surfaces exposed outside by a turning-over manner, and directly connects it with the support bracket without the traditional frame, thereby effectively reducing the storage space and avoiding the problem of loss.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Hereinafter, the implementation of the present invention will be described according to FIGS. 1 to 10. This description is not intended to limit the implementation of the present invention, but is one of the embodiments of the present invention.

Figure 1A:
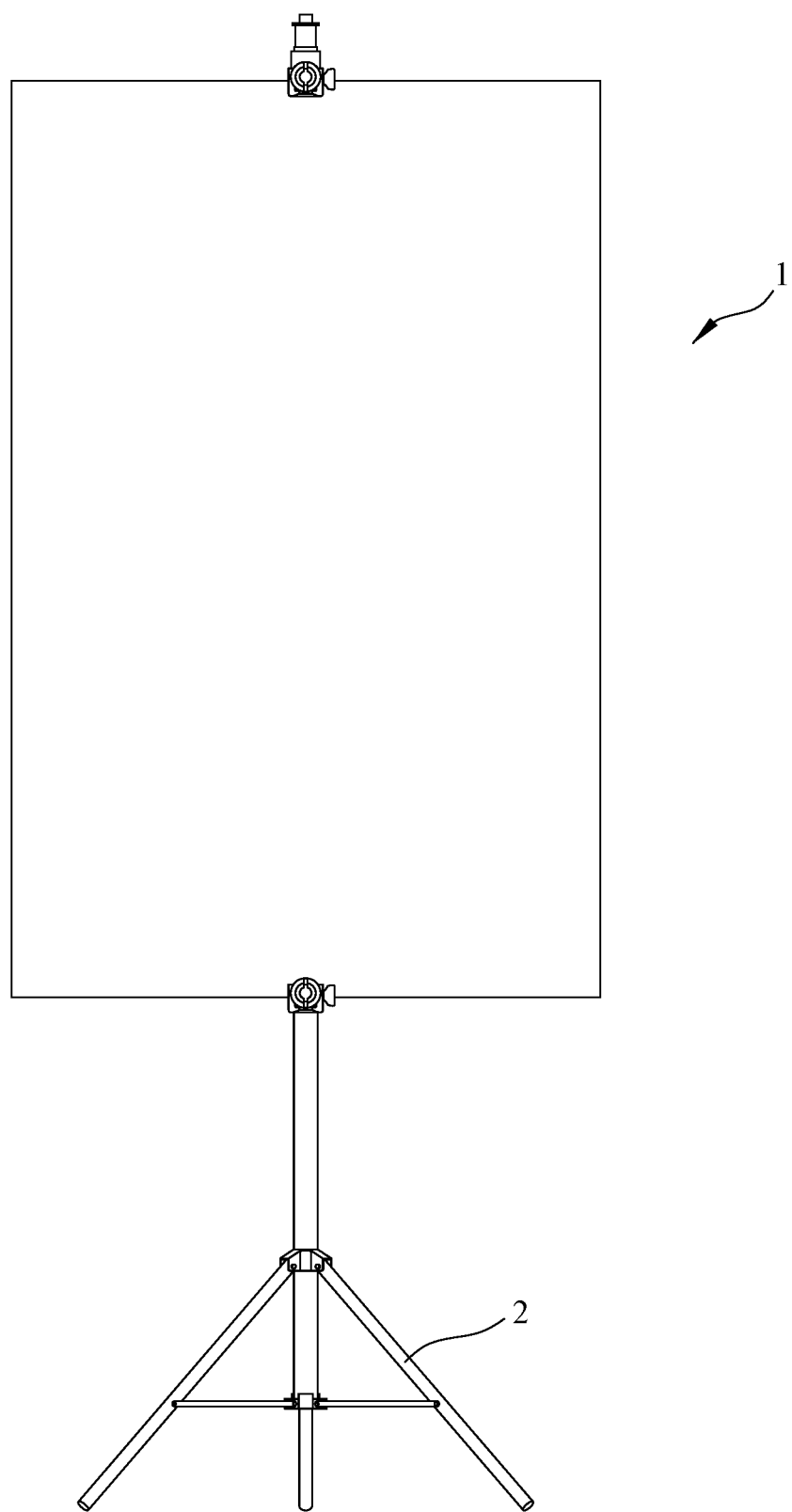
FIG. 1A is a first schematic view of a first embodiment of the present invention.

Please refer to FIGS. 1A to 4, which show a reversible cloth structure 1 according to the first embodiment of the present invention. As shown in FIGS. 1A and 1B, the reversible cloth structure 1 is disposed on a support bracket 2. As shown in FIG. 2A, the reversible cloth structure 1 includes two pieces of cloth, which are a first piece of cloth C1 and a second piece of cloth C2. The first piece of cloth C1 and the second piece of cloth C2 are quadrilaterals with a same size and are overlapped with each other. As shown in FIG. 2B, the first piece of cloth C1 has a first cloth surface C11 and a second cloth surface C12, and the second piece of cloth C2 has a third cloth surface C21 and a fourth cloth surface C22. As shown in FIG. 3A, the second cloth surface C12 and the third cloth surface C21 face each other, and the upper and lower adjacent edges of the first piece of cloth C1 and the second piece of cloth C2 are respectively joined together to form an upper joined edge L1 and a lower joined edge L2, thereby forming a first channel T1 in between the first piece of cloth C1 and the second piece of cloth C2 which are adjacent to each other. The other opposite edges on the left and right sides of the first piece of cloth C1 and the second piece of cloth C2 are respectively defined as a channel entrance L3 and a channel exit L4.

Figure 1B:
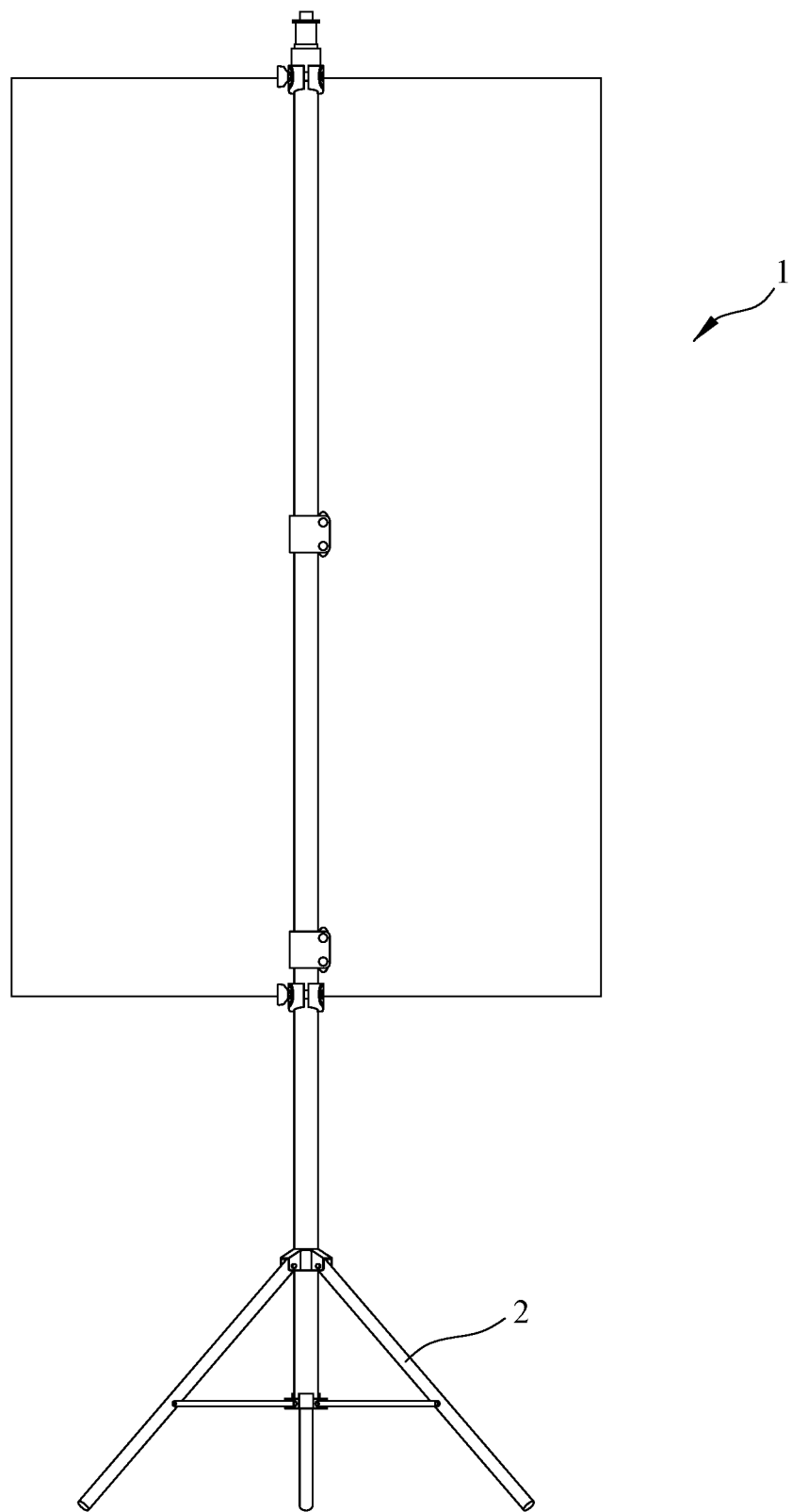
FIG. 1B is a second schematic view of the first embodiment of the present invention.
Figure 2A:
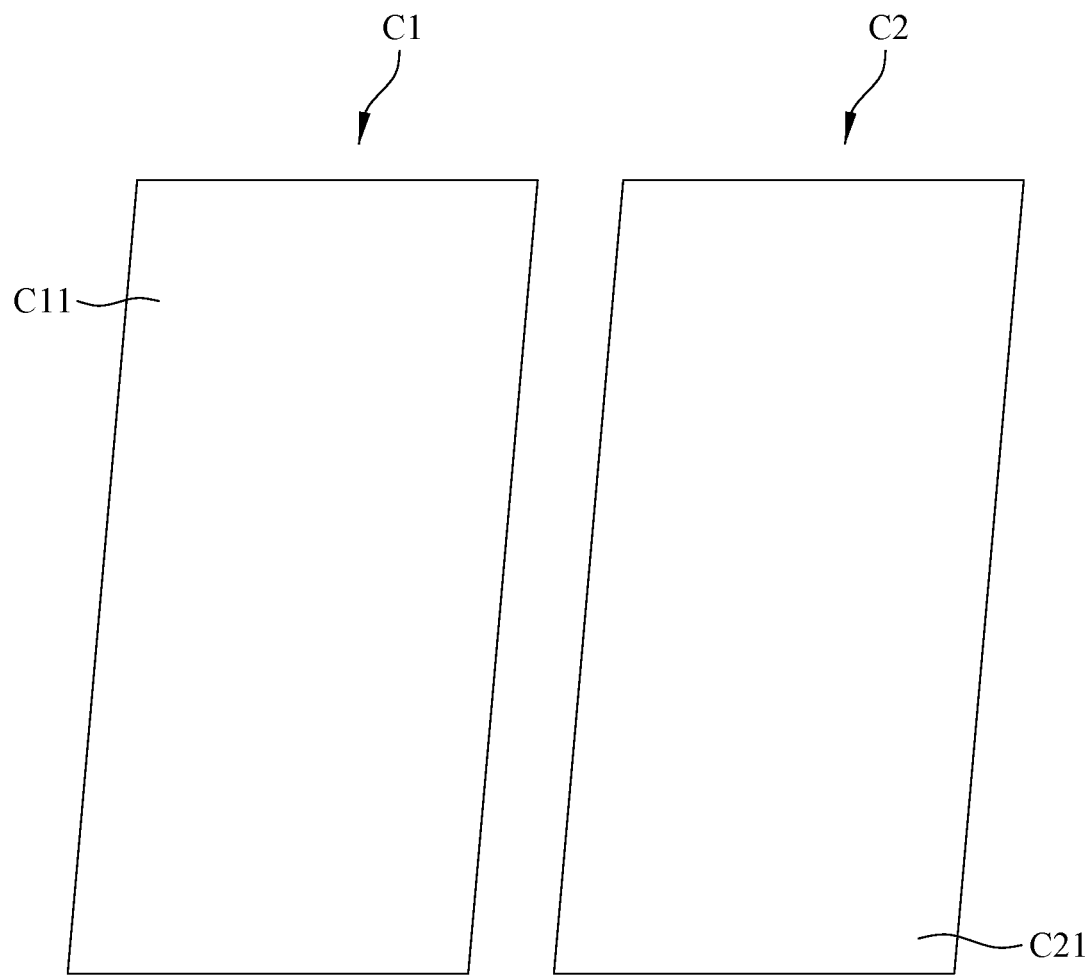
FIG. 2A is a first exploded view of the two pieces of cloth of the first embodiment of the present invention.
Figure 2B:
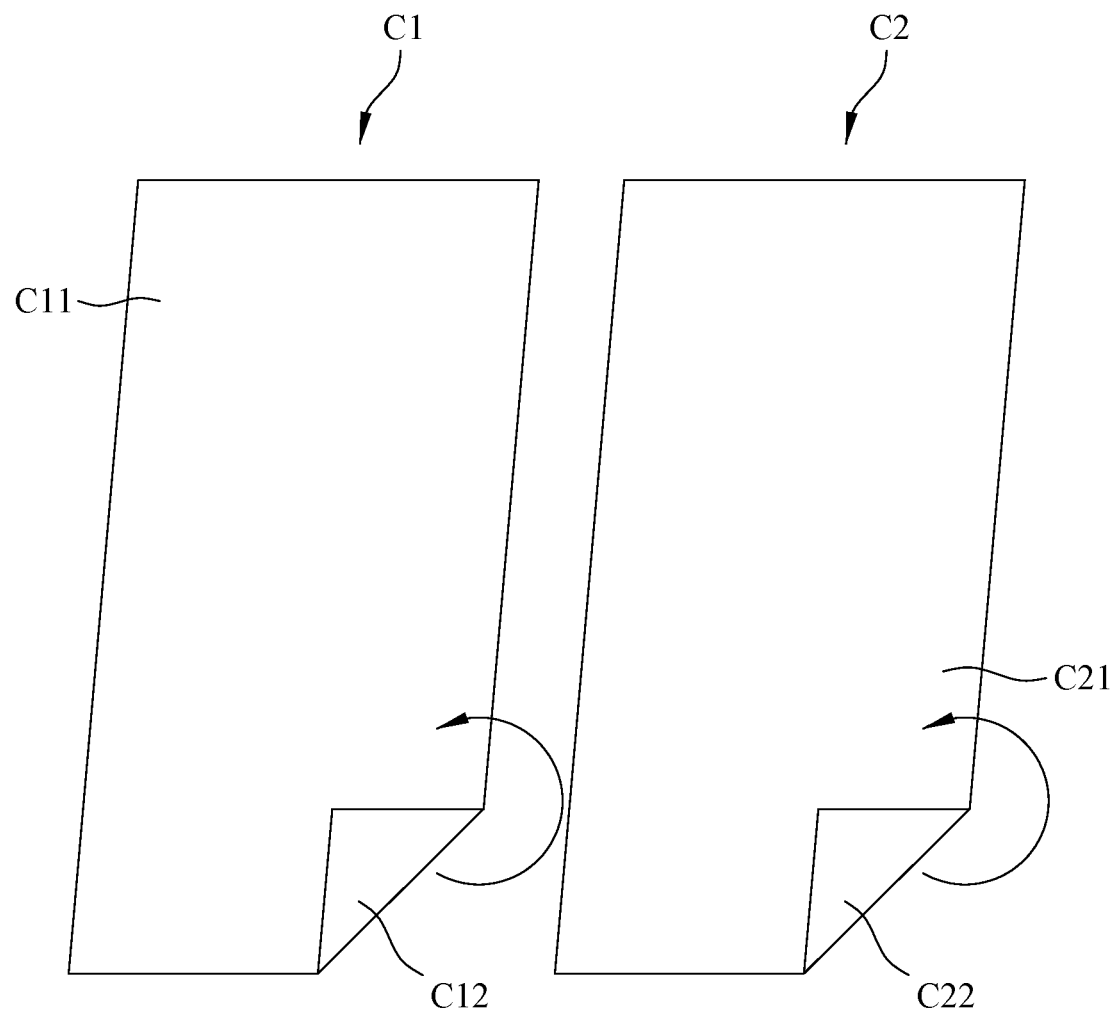
FIG. 2B is a second exploded view of the two pieces of cloth of the first embodiment of the present invention.
Figure 3A:
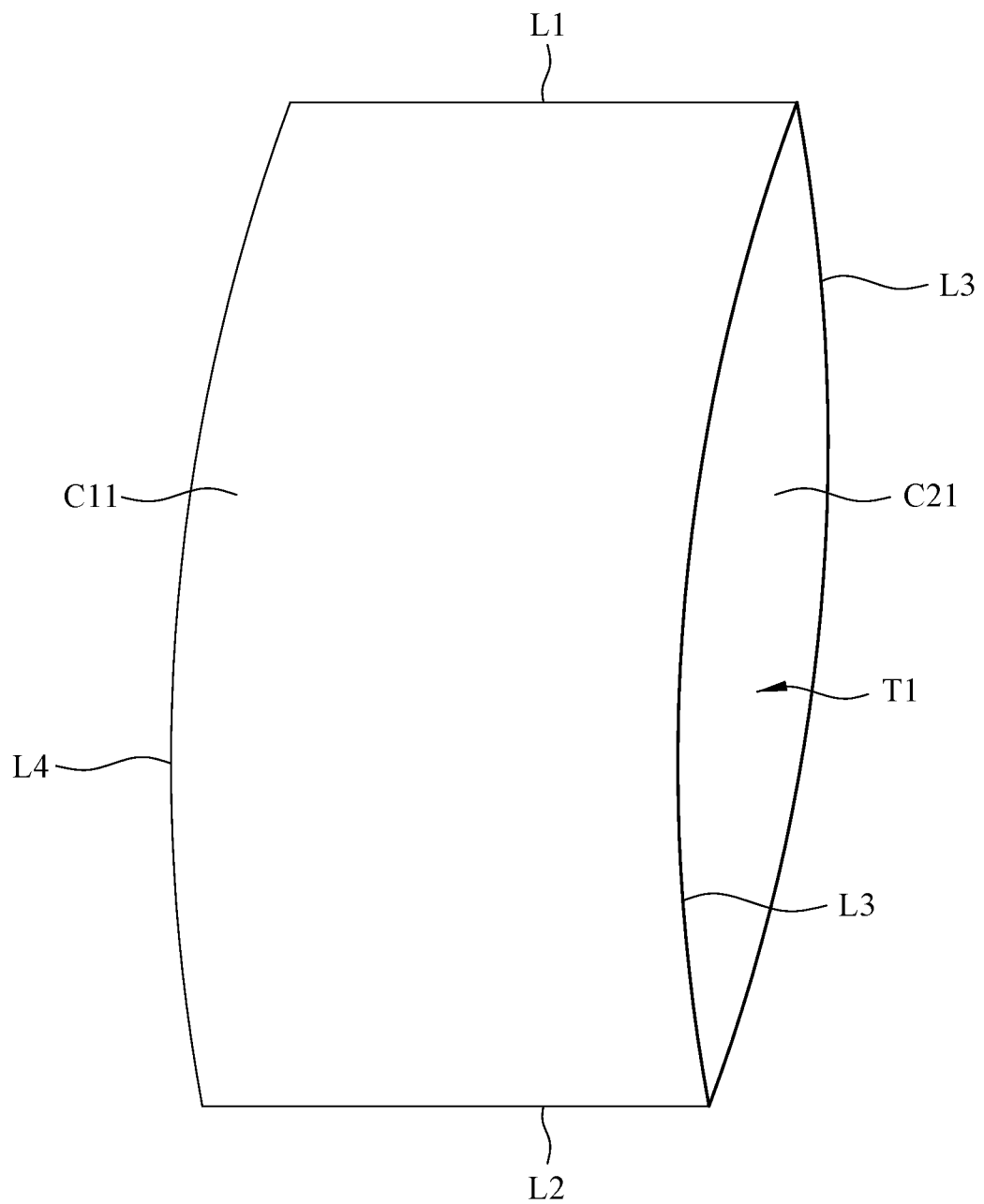
FIG. 3A is a schematic view of the first embodiment of the present invention before being turned over.
Figure 3B:
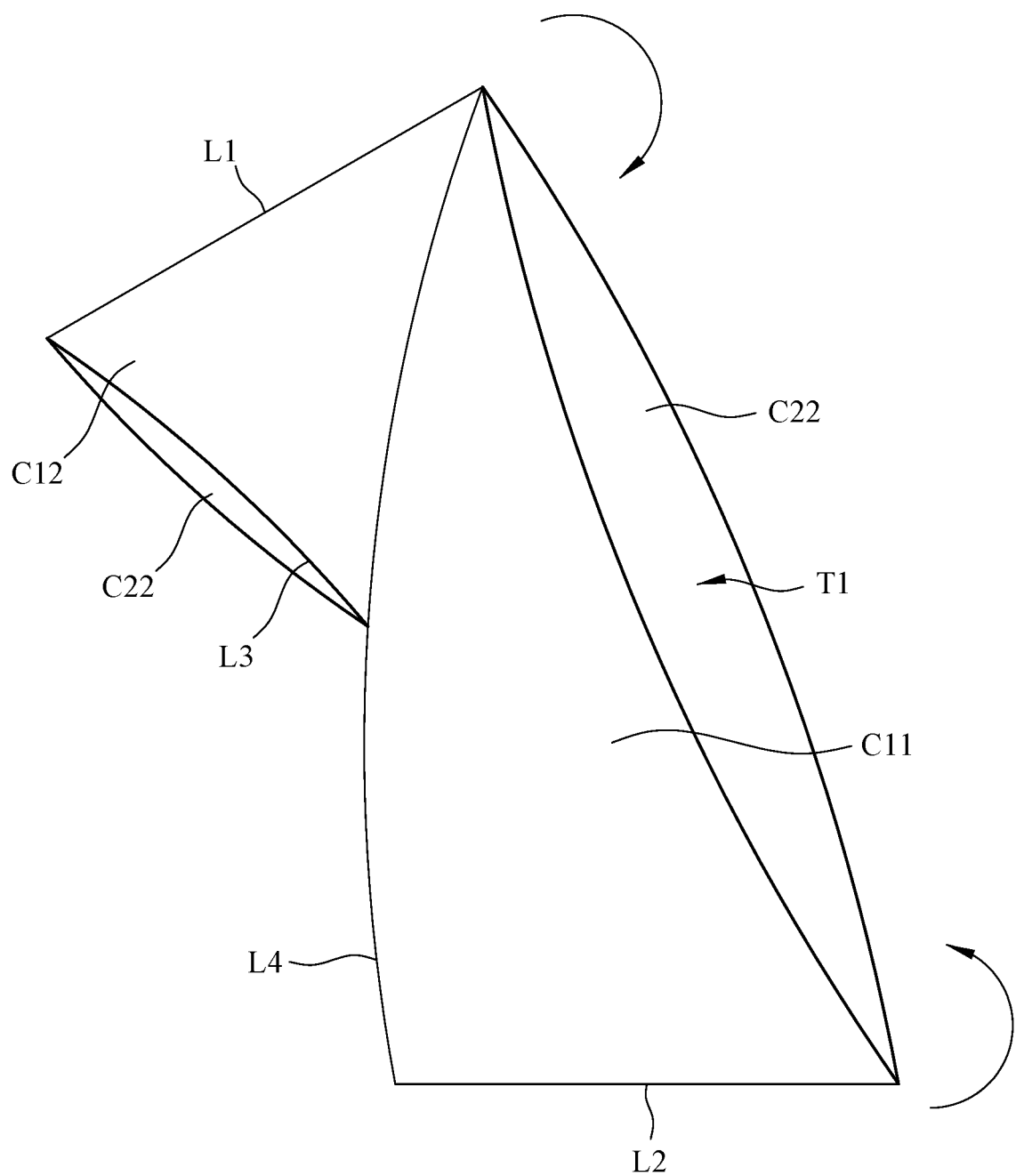
FIG. 3B is a schematic view of the first embodiment of the present invention while it is turned over toward a first channel.
Figure 3C:
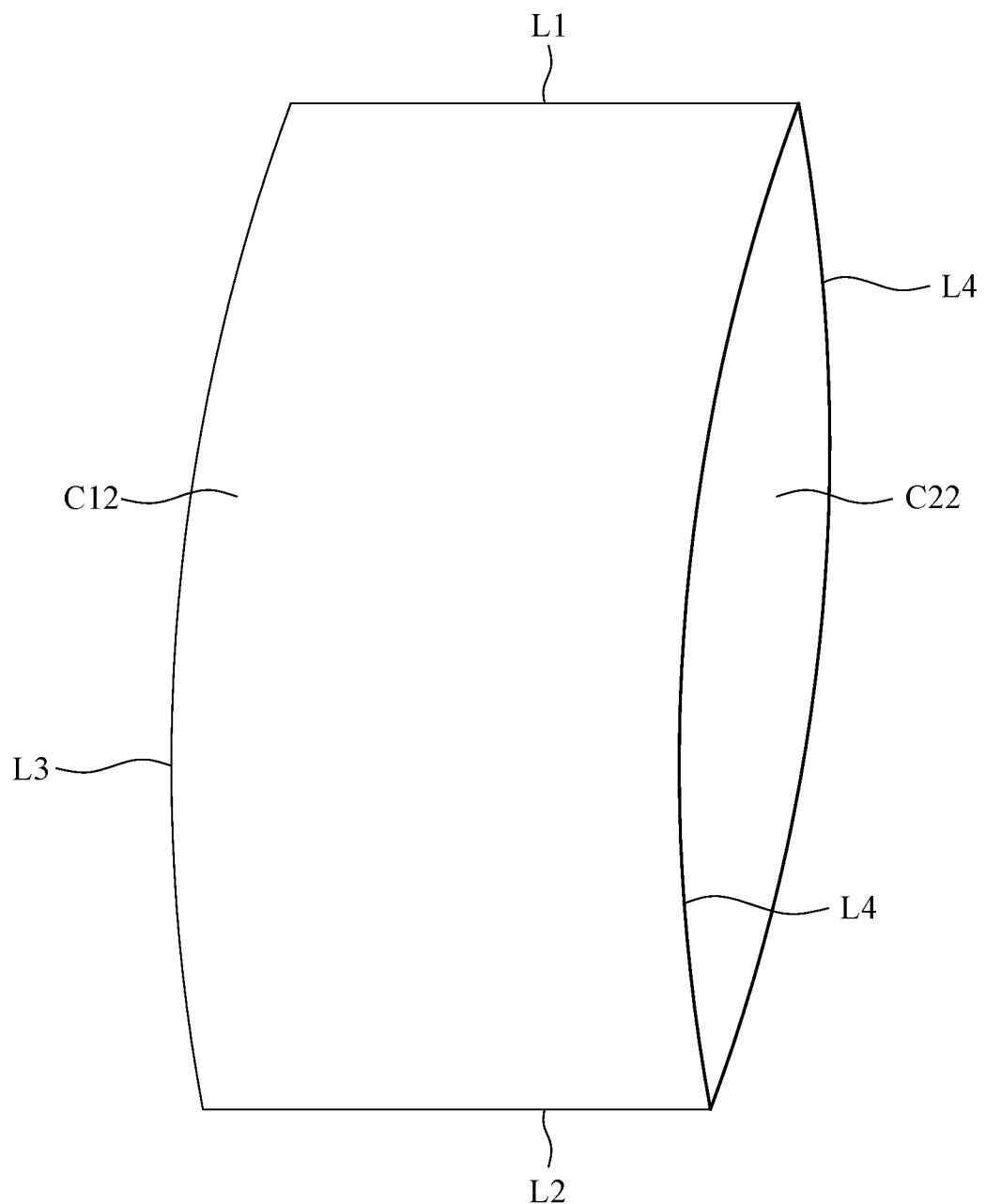
FIG. 3C is a schematic view of the first embodiment of the present invention after being turned over toward the first channel.
Figure 4:
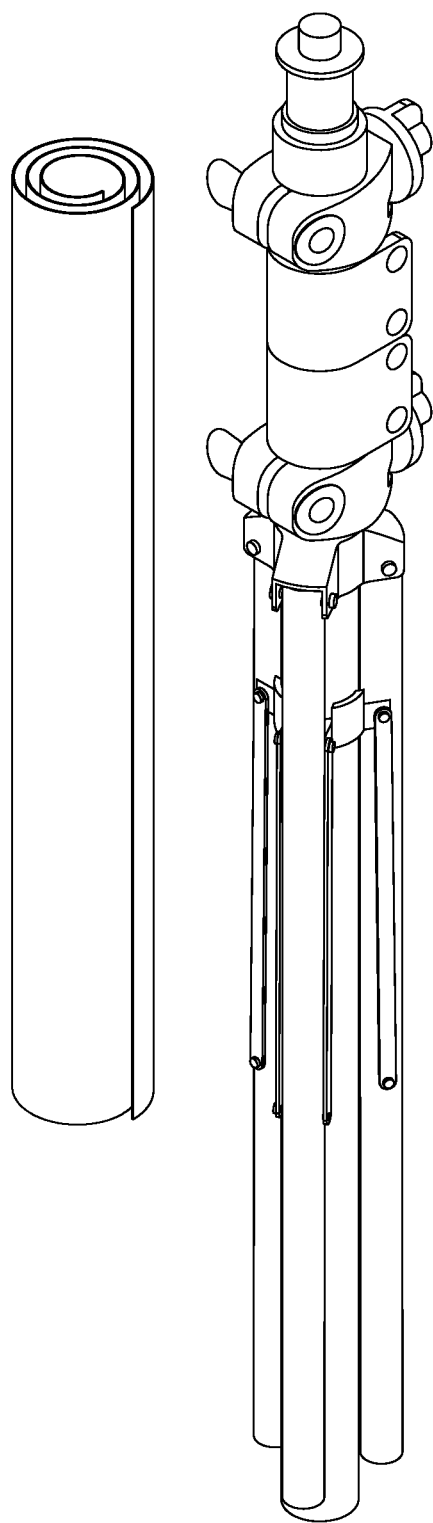
FIG. 4 is a schematic view showing a folded state of the first embodiment of the present invention.

When the upper joined edge L1 and the lower joined edge L2 are disposed to be a separate state from the support bracket 2, as shown in FIGS. 3A and 3B, the upper joined edge L1 and the lower joined edge L2 can be turned over toward the channel entrance L3, inserted into the first channel T1, and pulled out from the channel exit L4. As shown in FIG. 3C, the second cloth surface C12 and the third cloth surface C21, which are adjacent to the first channel T1, can be turned over outward, respectively. As shown in FIGS. 1A and 1B, the upper joined edge L1 and the lower joined edge L2 are attached to the support bracket 2, and the first piece of cloth C1 and the second piece of cloth C2 are flatly disposed on the support bracket 2. Therefore, as shown in FIG. 3C, the second cloth surface C12 and the third cloth surface C21 are exposed outside, and the first cloth surface C11 and the fourth cloth surface C22 are turned over inward and adjacent to each other. As shown in FIG. 4, the reversible cloth structure 1 can be rolled into a long bar shape for convenient storage with the support bracket 2. Further, a periphery edge of the upper joined edge L1 is made of cloth with better elasticity, so that when the upper joined edge L1 and the lower joined edge are disposed in a separate state from the support bracket 2, the turning-over operation can be more smooth; and when the upper joined edge L1 and the lower joined edge L2 are attached to the support bracket 2, the first piece of cloth C1 and the second piece of cloth C2 can be more flatly disposed on the support bracket 2. Further, when the first piece of cloth C1 and the second piece of cloth C2 are both made of a material with better elasticity, such objective can also be achieved.

Figure 5:
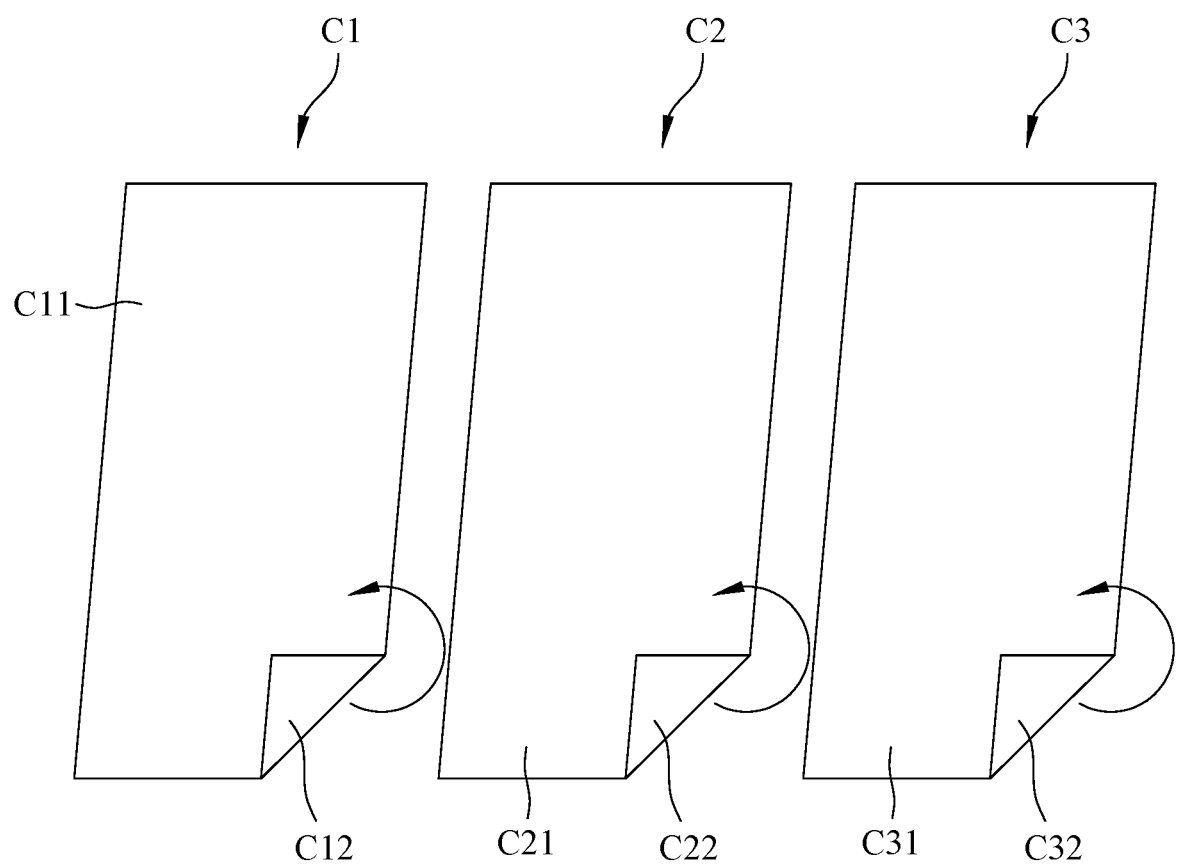
FIG. 5 is a exploded view of the three pieces of cloth of a second embodiment of the present invention.
Figure 6:
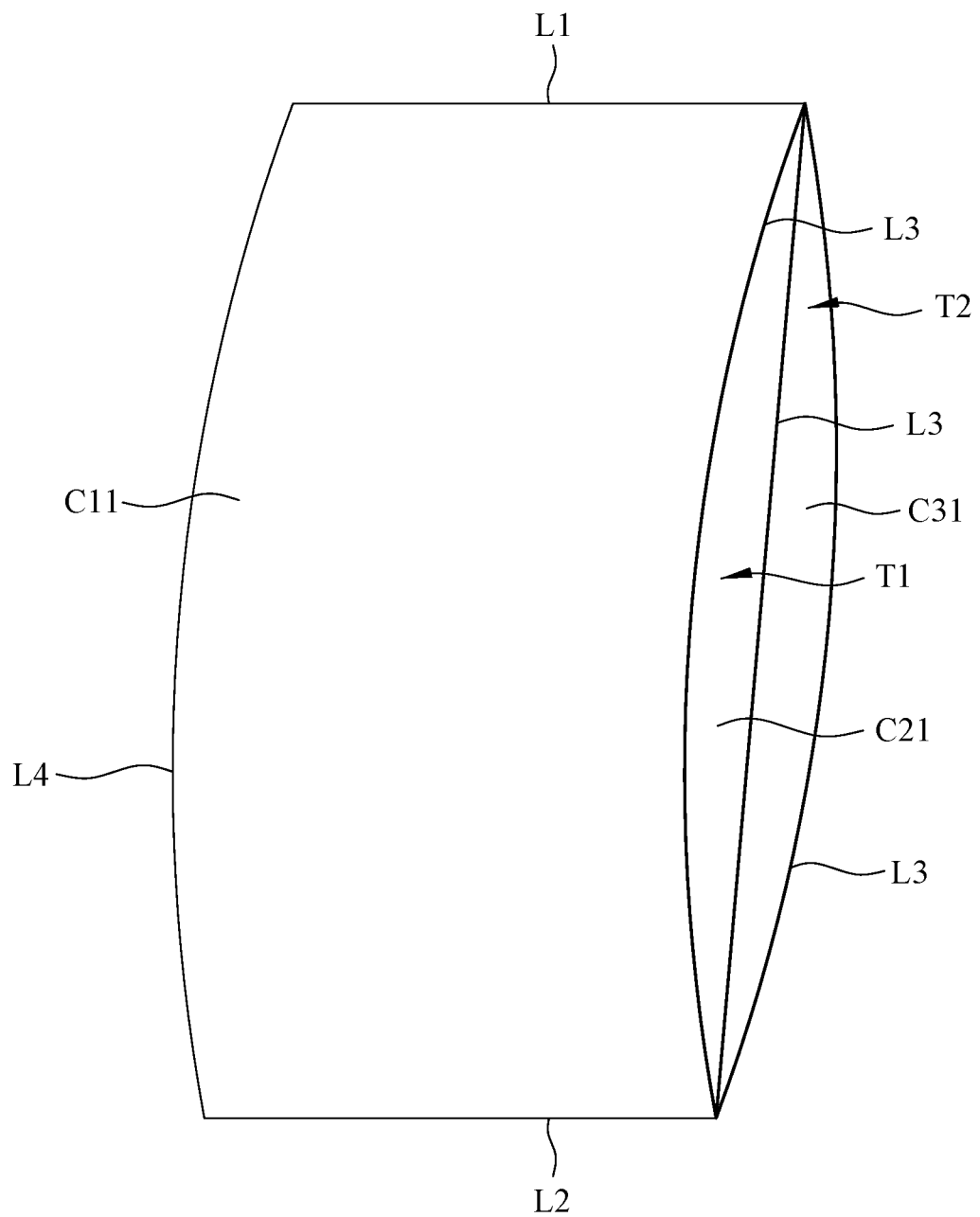
FIG. 6 is a schematic view of the second embodiment of the present invention before being turned over.

Please refer to FIGS. 5 to 8B, which show a second embodiment of the present invention. As shown in FIG. 5, the second embodiment of the present invention includes three pieces of cloth, which are the first piece of cloth C1, the second piece of cloth C2, and a third piece of cloth C3. The first piece of cloth C1, the second piece of cloth C2, and the third piece of cloth C3 are quadrilaterals with a same size, and are overlapped with one another. As shown in FIG. 6, the first piece of cloth C1 has the first cloth surface C11 and the second cloth surface C12, the second piece of cloth C2 has the third cloth surface C21 and the fourth cloth surface C22, and the third piece of cloth C3 has a fifth cloth surface C31 and a sixth cloth surface C32. The second cloth surface C12 and the third cloth surface C21 are adjacent to each other, the fourth cloth surface C22 and the fifth cloth surface C31 are adjacent to each other, and the upper and lower adjacent edges of the first piece of cloth C1, the second piece of cloth C2 and the third piece of cloth C3 are respectively joined together to form an upper joined edge L1 and a lower joined edge L2, thereby forming a first channel T1 in between the first piece of cloth C1 and the second piece of cloth C2 which are adjacent to each other, and a second channel T2 in between the second piece of cloth C2 and the third piece of cloth C3 which are adjacent to each other. The other opposite edges on the left and right sides of the first piece of cloth C1, the second piece of cloth C2 and the third piece of cloth C3 are respectively defined as the channel entrance L3 and the channel exit L4.

Figure 7A:
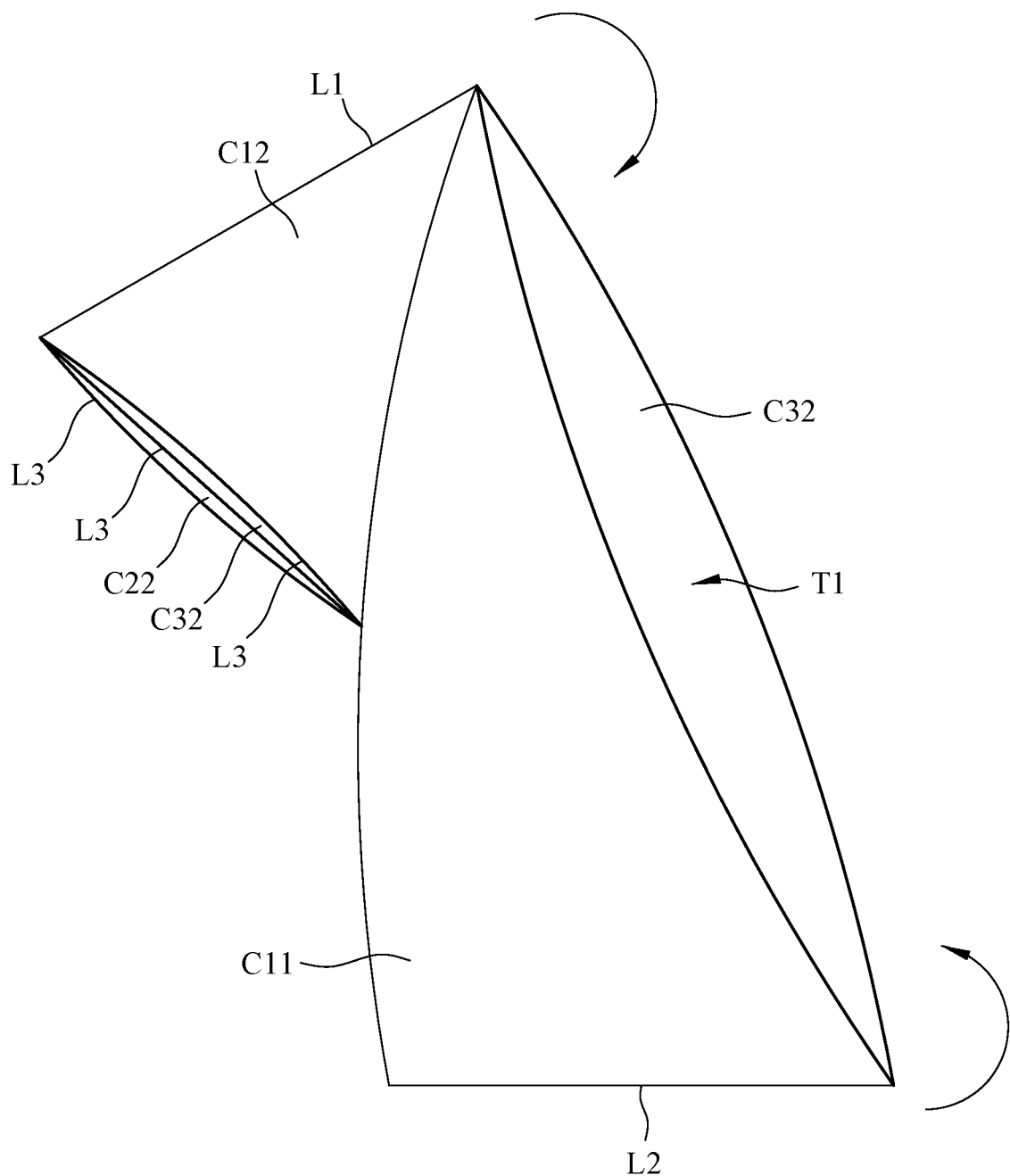
FIG. 7A is a schematic view of the second embodiment of the present invention while it is turned over toward a first channel.
Figure 7B:
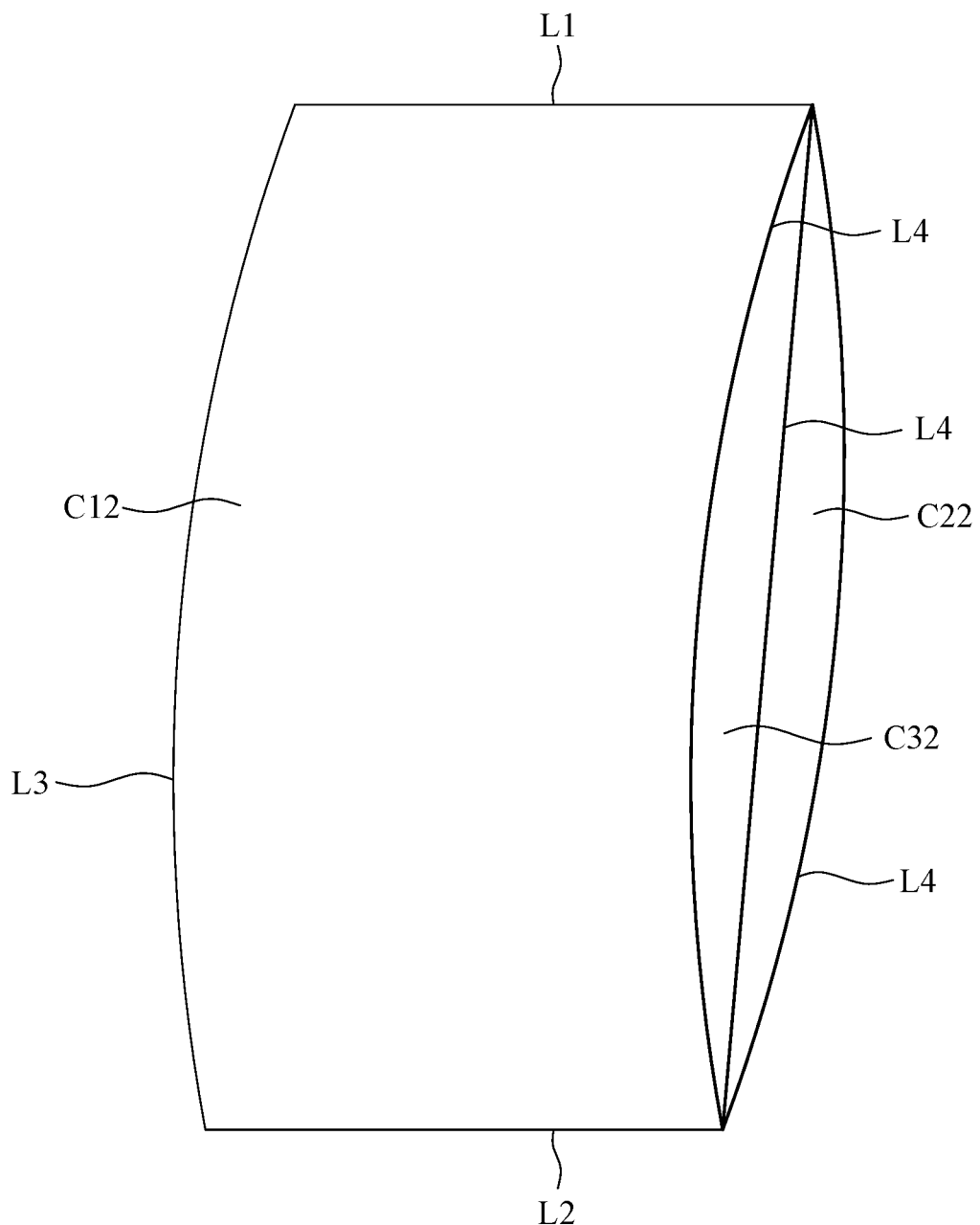
FIG. 7B is a schematic view of the second embodiment of the present invention after being turned over toward the first channel.
Figure 8A:
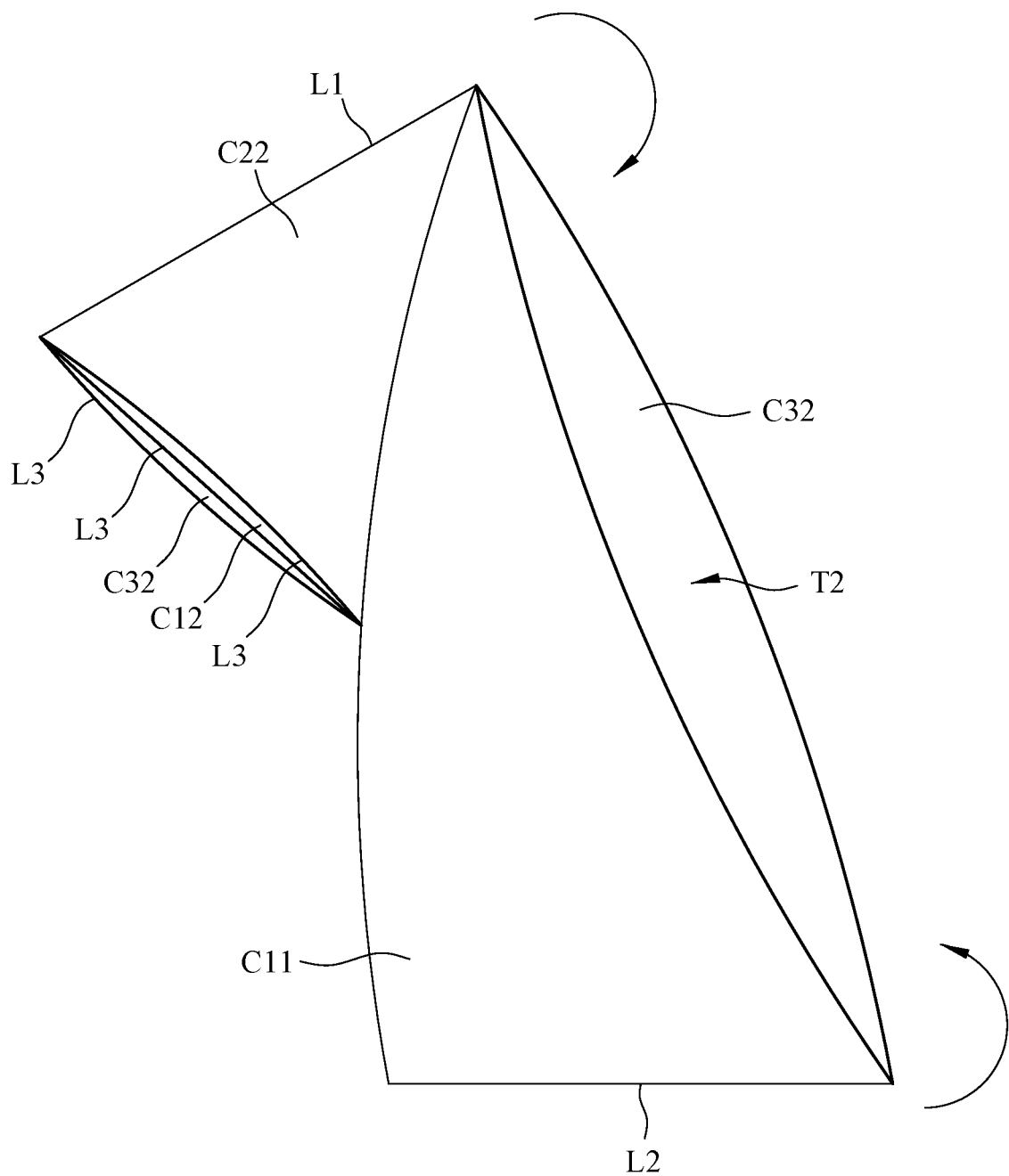
FIG. 8A is a schematic view of the second embodiment of the present invention while it is turned over toward a second channel.
Figure 8B:
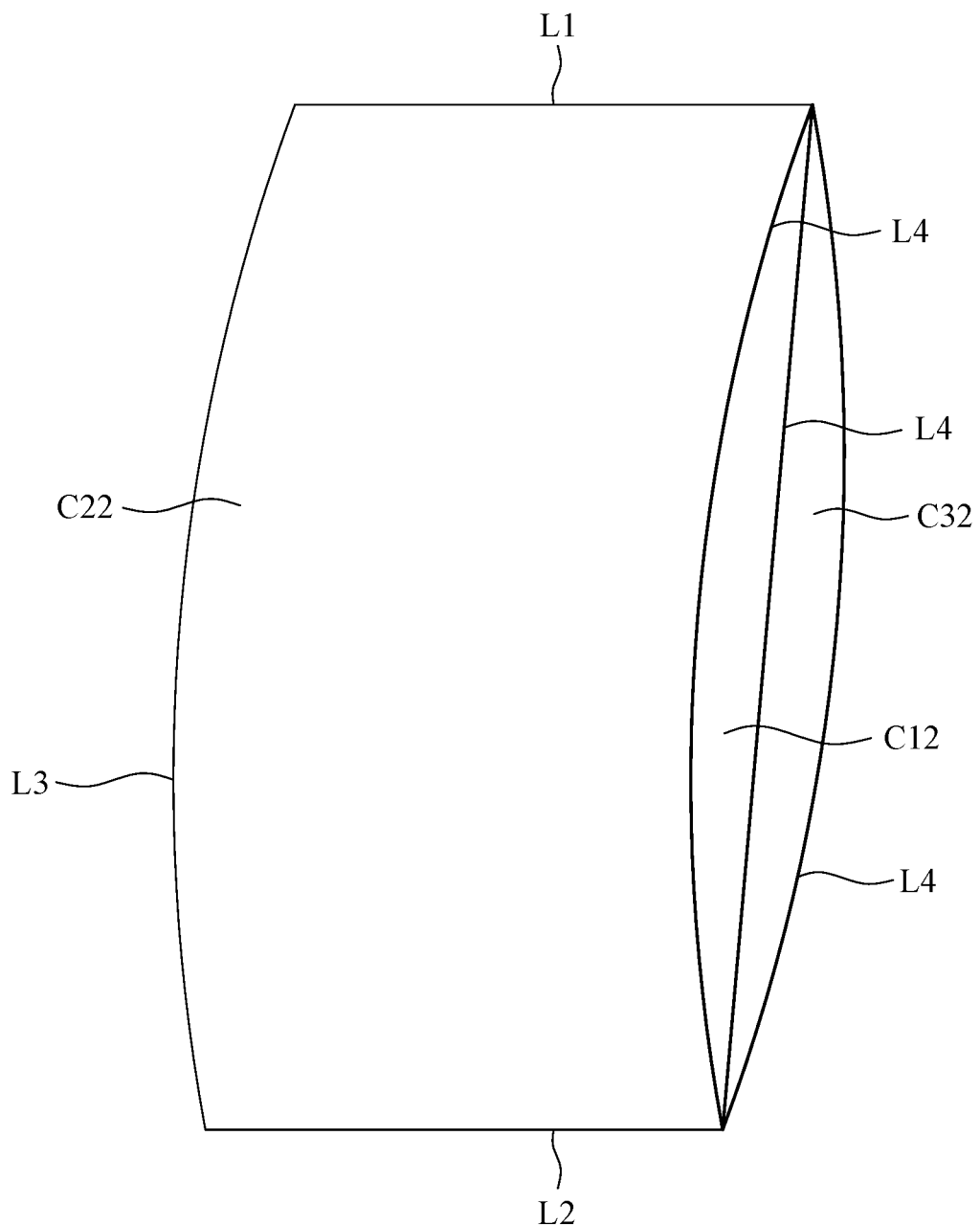
FIG. 8B is a schematic view of the second embodiment of the present invention after being turned over toward the second channel.

When the upper joined edge L1 and the lower joined edge L2 are disposed in a separate state from the support bracket 2, as shown in FIG. 7A, the upper joined edge L1 and the lower joined edge L2 can be turned over toward the channel entrance L3, inserted into the first channel T1, and pulled out from the channel exit L4. As shown in FIG. 7B, the second cloth surface C12 and the third cloth surface C21, which are adjacent to the first channel T1, can be turned over outward, respectively. Alternatively, as shown in FIGS. 8A and 8B, the upper joined edge L1 and the lower joined edge L2 can be turned over toward the channel entrance L3, inserted into the second channel T2, and pulled out from the channel exit L4. As shown in FIG. 8B, the fourth cloth surface C22 and the fifth cloth surface C31, which are adjacent to the second channel T2, can be turned over outward, respectively. In the present invention, the desired cloth surfaces can be exposed outside in a turning-over manner, so as to achieve the use effect and avoid the problem of complicated storage.

Figure 9:
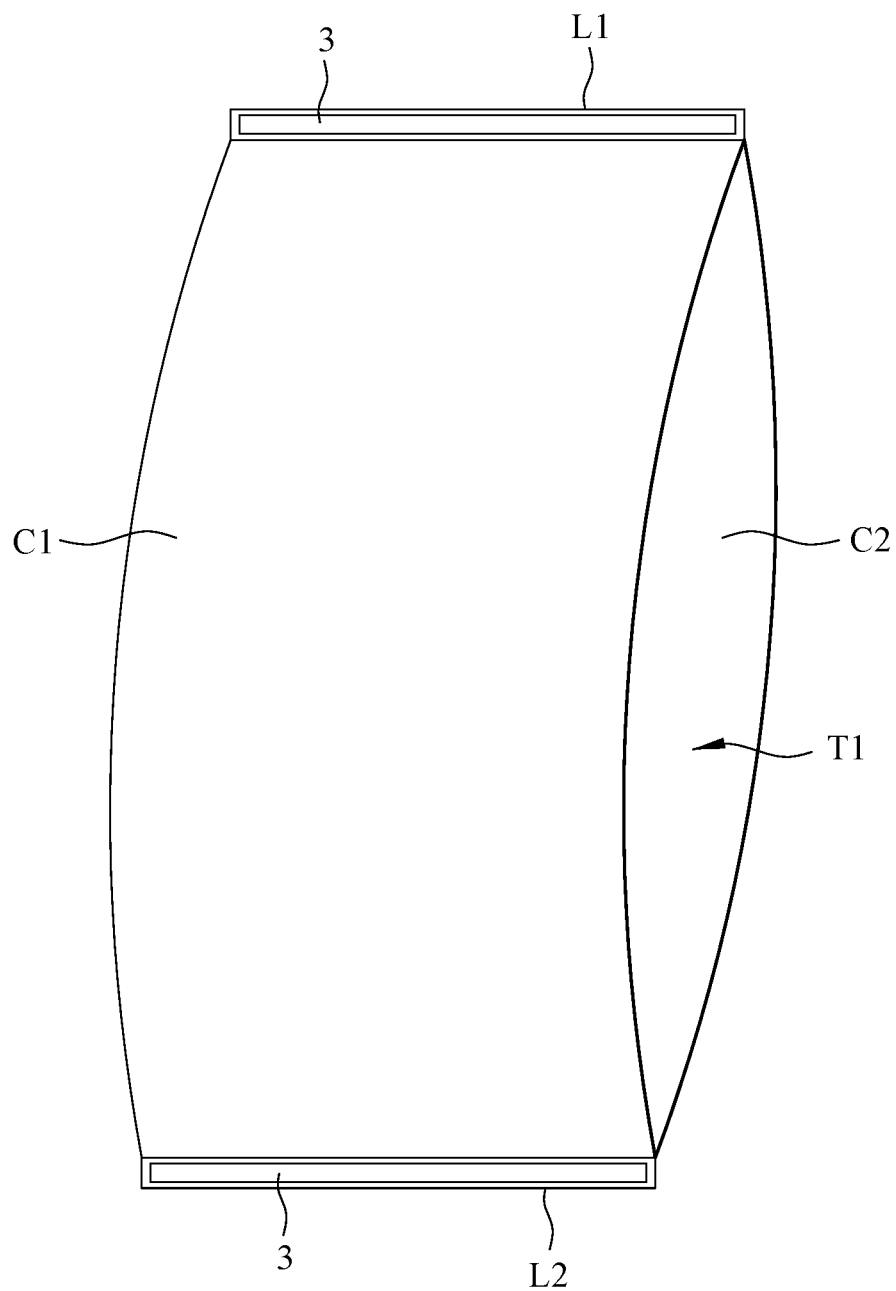
FIG. 9 is a schematic view of a third embodiment of the present invention.

Please refer to FIGS. 9 and 4, which show a third embodiment of the present invention. As shown in FIG. 9, the upper joined edge L1 and the lower joined edge L2 each are provided with a support stem 3. When the upper joined edge L1 and the lower joined edge L2 are attached to the support bracket 2, the support stem 3 is used as an auxiliary tool of connection for enhancing the support force; and when the upper joined edge L1 and the lower joined edge L2 are disposed in the separate state from the support bracket 2, as shown in FIG. 4, the support stem 3 is used as a central stem for storage and allows each piece of cloth to be rolled into a long bar shape at the same time, which is beneficial for the storage with the support bracket and is convenient for carrying.

Figure 10A:
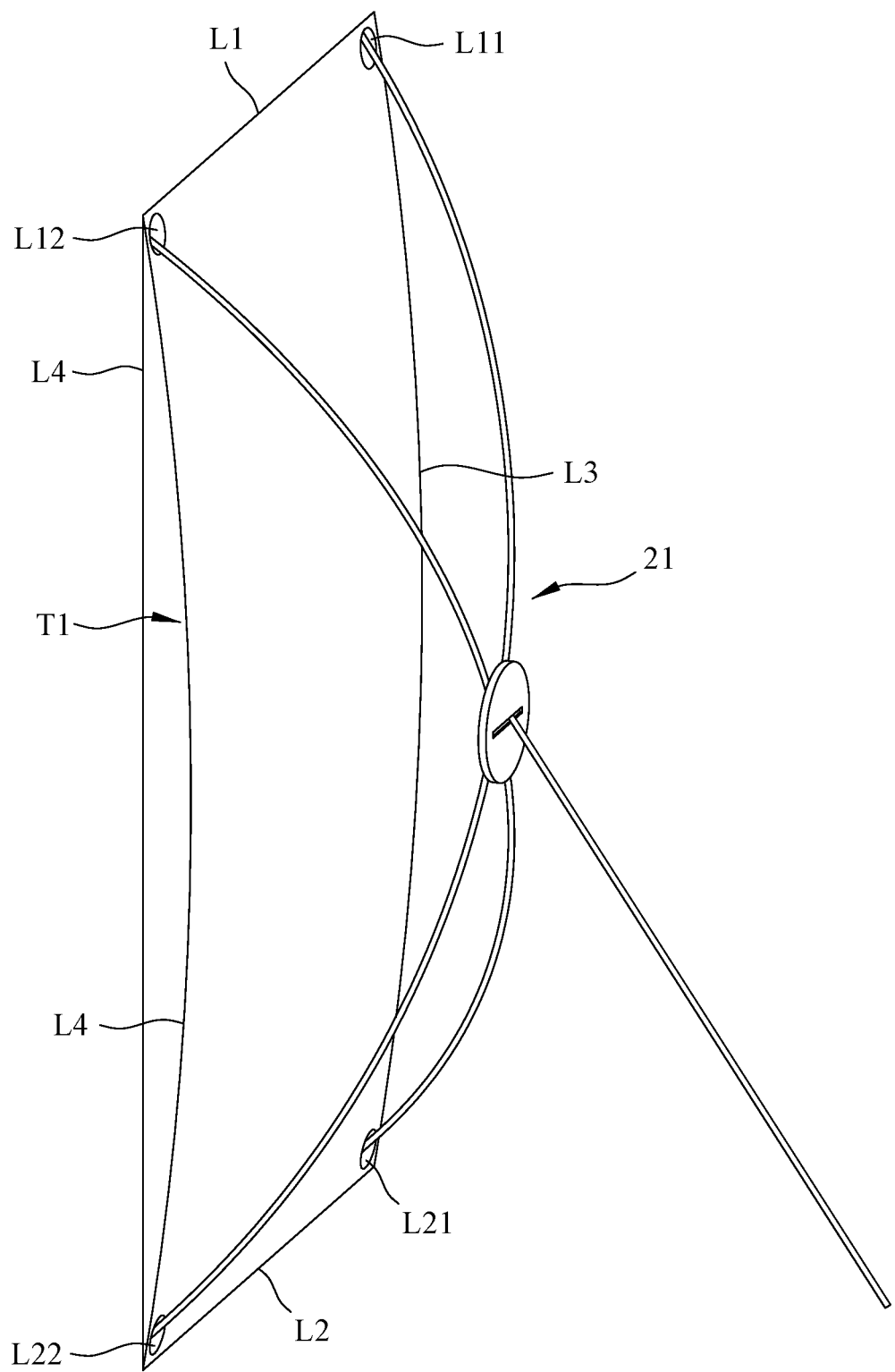
FIG. 10A is a schematic view of a fourth embodiment of the present invention after being assembled.
Figure 10B:
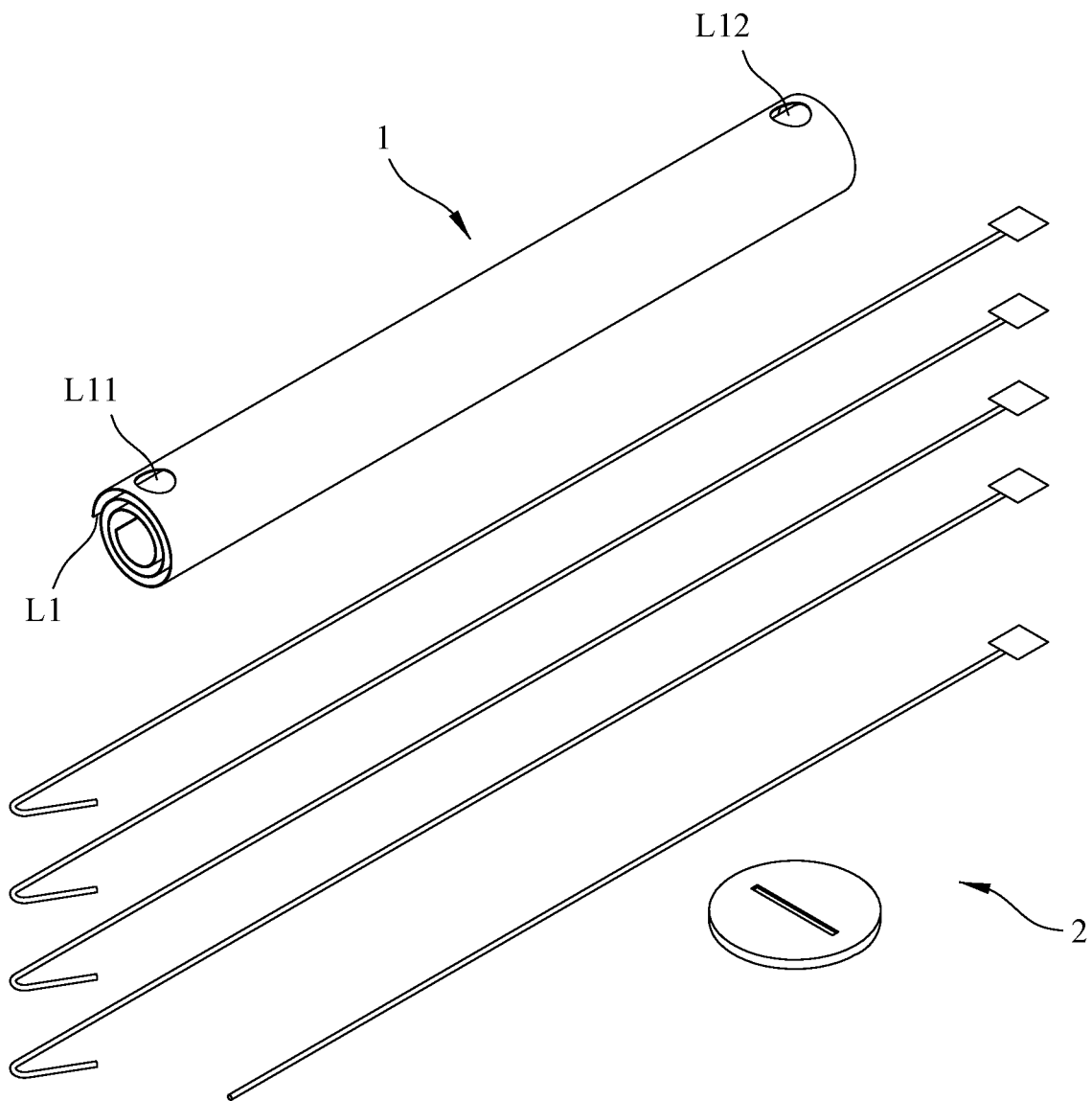
FIG. 10B is a schematic view showing a folded state of the fourth embodiment of the present invention.

Please refer to FIGS. 10A and 10B, which show a fourth embodiment of the present invention. As in FIG. 10A, both ends of both of the upper joined edge L1 and the lower joined edge L2 are provided with a first hole L11 and a second hole L12, and a third hole L21 and a fourth hole L22 at appropriate positions, respectively. The four holes can be assembled with an X-shaped support bracket 21. As in FIG. 10B, the X-shaped support bracket 21 and the reversible cloth structure 1 can be stored into a long bar shape.

Preferably, in a fifth embodiment of the present invention, the channel entrance and the channel exit are non-linear and can be bulged outward or recessed inward according to the requirements of use, thereby allowing the first piece of cloth C1 and the second piece of cloth C2 to be provided in other shapes.

The foregoing descriptions and illustrations are merely explanations for better embodiments of the present invention. Those skilled in the art can make other modifications according to the claimed scope of the accompanying claims and the foregoing descriptions, provided that such modifications are still belonged to the inventive spirit of the present invention and should fall within the claimed scope of the present invention.

What is claimed is:

1. A support assembly for advertisement or photography, comprising a reversible cloth structure and a support bracket, wherein the reversible cloth structure is attached to the support bracket in a manner that the support bracket is located outside the reversible cloth structure, the reversible cloth structure including:
   at least two pieces of cloth that are quadrilaterals with a same size and are overlapped with one another, each piece of the cloth having two cloth surfaces, upper and lower edges of the at least two pieces of cloth being respectively joined together to form an upper joined edge and a lower joined edge so that a channel is formed in between each two adjacent pieces of cloth, and right edges and left edges of the at least two pieces of cloth being respectively defined as a channel entrance and a channel exit;
   wherein when the cloth structure is in a separate state from the support bracket, the upper and lower joined edges can be turned over toward the channel entrance, inserted into a same channel and pulled out from the channel exit so that two inner cloth surfaces in the same channel are turned over and exposed outward; and when a part or all of the upper joined edge and the lower joined edge of the cloth structure are attached to the support bracket, outsides of the at least two pieces of cloth are overlapped and flatly disposed on the support bracket.

2. The support assembly according to claim 1, wherein the upper and lower edges each are provided with a support stem.

3. The support assembly according to claim 1, wherein the channel entrance and the channel exit are non-linear.

4. The support assembly according to claim 1, wherein the upper joined edge and the lower joined edge are attached to the support bracket.

5. The support assembly according to claim 1, wherein the support bracket is a X-shaped support bracket,
   both ends of both of the upper joined edge and the lower joined edge are provided with a first hole, a second hole, a third hole and a fourth hole at appropriate positions respectively, and
   wherein the four holes are assembled with the X-shaped support bracket.

\* \* \* \* \*